(No Model.) 4 Sheets—Sheet 1.
W. H. FORD.
CONDUIT SYSTEM FOR ELECTRIC RAILWAYS.
No. 451,815. Patented May 5, 1891.
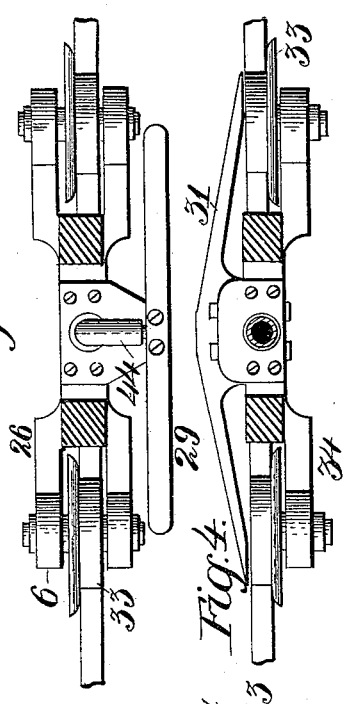
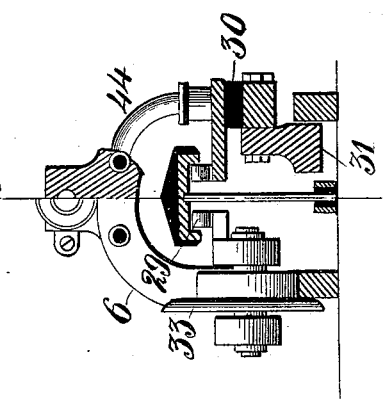
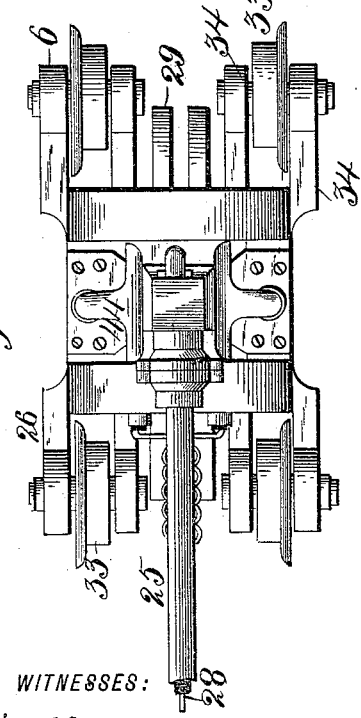
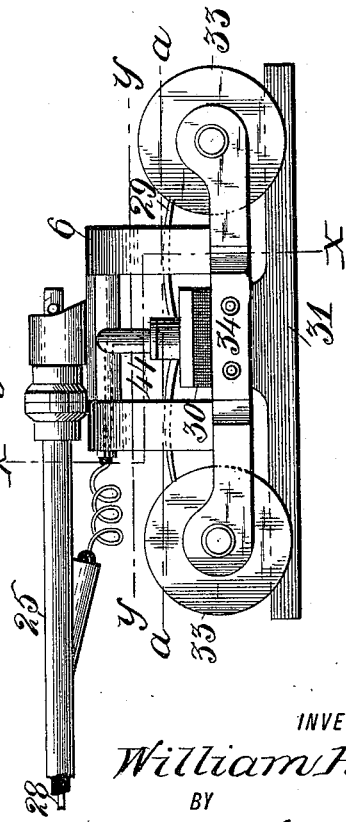
WITNESSES:
INVENTOR
William H. Ford.
BY
Higdon & Higdon
ATTORNEYS.

(No Model.) 4 Sheets—Sheet 2.
W. H. FORD.
CONDUIT SYSTEM FOR ELECTRIC RAILWAYS.
No. 451,815. Patented May 5, 1891.
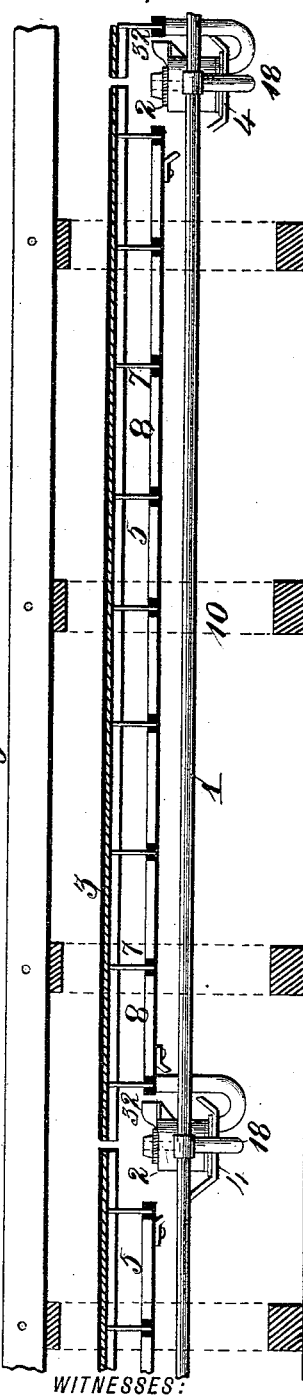
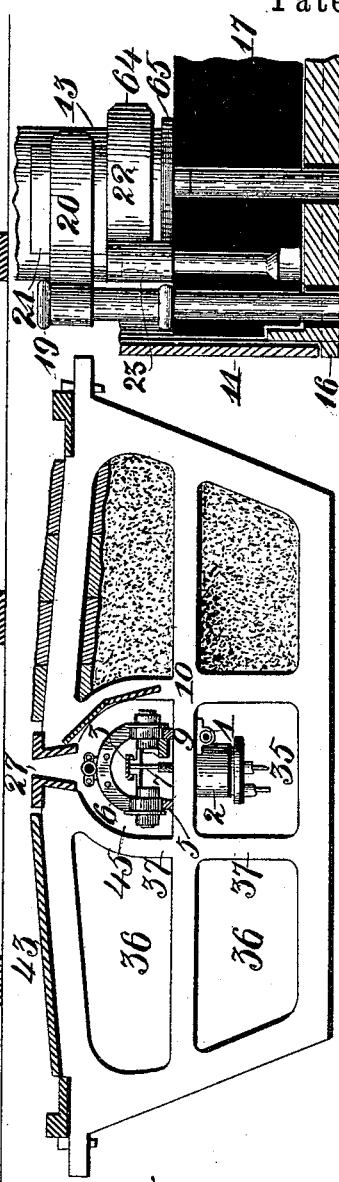
WITNESSES:
INVENTOR
William H. Ford.
BY
Higdon & Higdon
ATTORNEYS
THE NORRIS PETERS CO., PHOTO-LITHO., WASHINGTON, D. C.

(No Model.)  4 Sheets—Sheet 3.
W. H. FORD.
CONDUIT SYSTEM FOR ELECTRIC RAILWAYS.
No. 451,815.  Patented May 5, 1891.
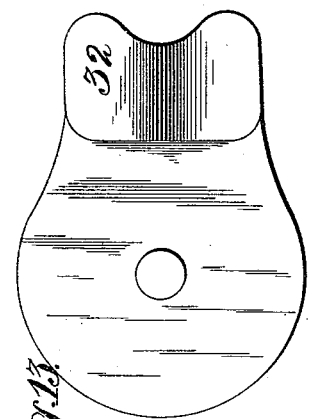
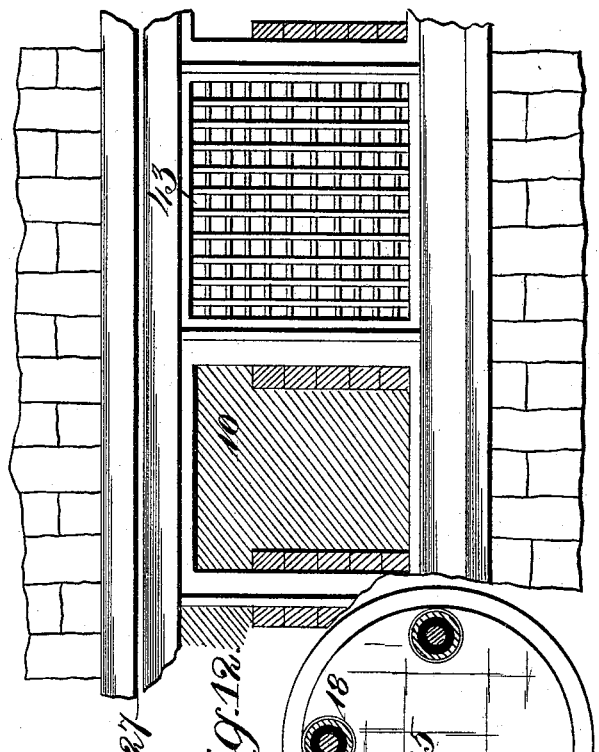
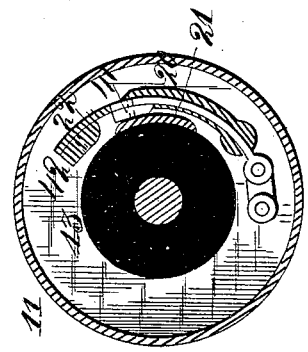
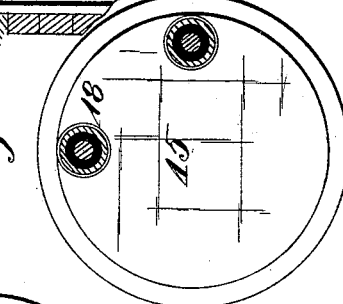
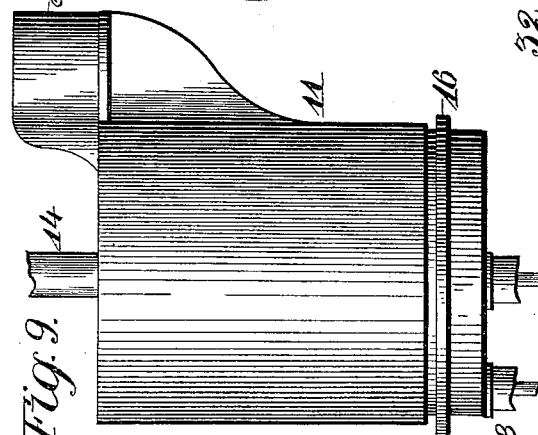
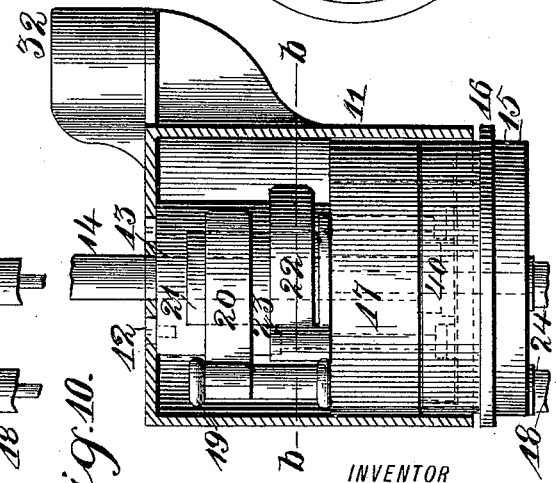
WITNESSES:
INVENTOR
William H. Ford.
BY
Higdon & Higdon
ATTORNEYS (No Model.) 4 Sheets—Sheet 4.
W. H. FORD.
CONDUIT SYSTEM FOR ELECTRIC RAILWAYS.
No. 451,815. Patented May 5, 1891.
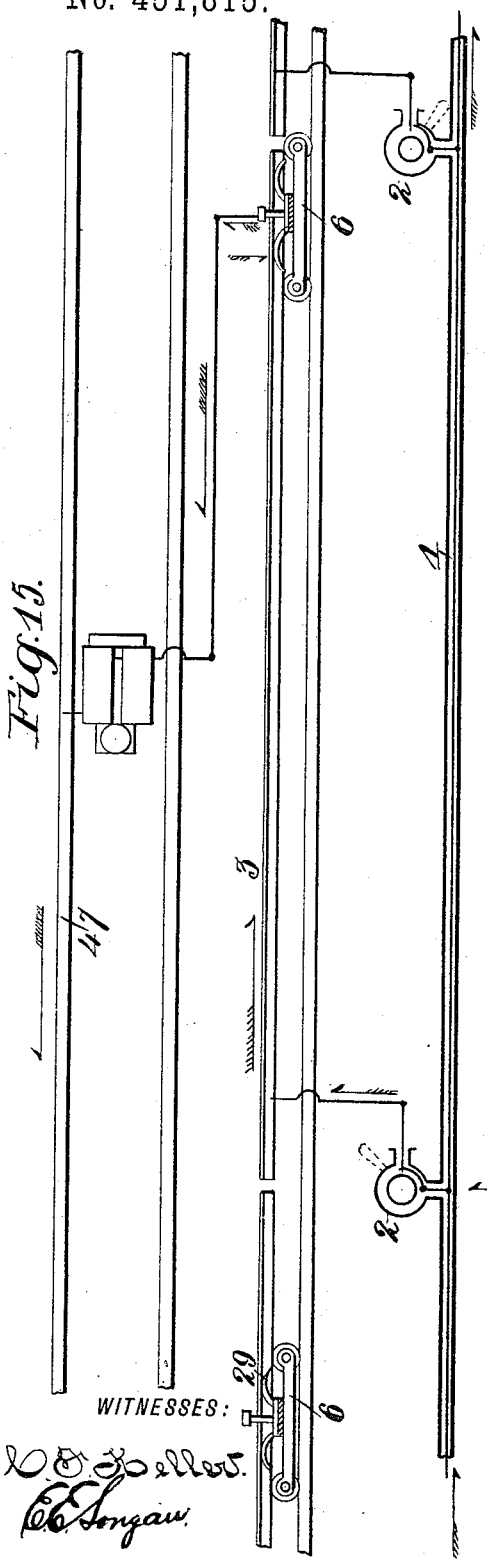
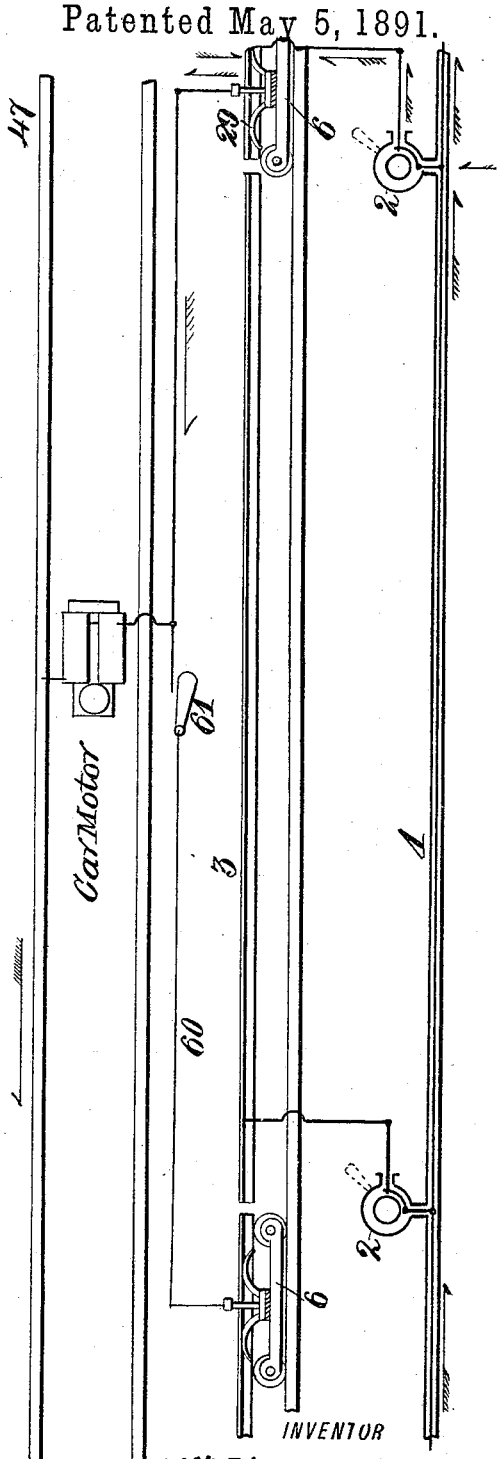
WITNESSES:
INVENTOR
William H. Ford
BY
Higdon & Higdon
ATTORNEYS.

UNITED STATES PATENT OFFICE.

WILLIAM H. FORD, OF ST. LOUIS, MISSOURI.

CONDUIT SYSTEM FOR ELECTRIC RAILWAYS.

SPECIFICATION forming part of Letters Patent No. 451,815, dated May 5, 1891.

Application filed October 8, 1890. Serial No. 367,435. (No model.)

*To all whom it may concern:*

Be it known that I, WILLIAM H. FORD, of the city of St. Louis, State of Missouri, have invented certain new and useful Improvements in Conduits and Systems of Current Distribution for Electric Conduit Railways, of which the following is a full, clear, and exact description, reference being had to the accompanying drawings, forming a part hereof.

My invention relates to improvements in systems of conduits and current distribution for electric conduit railways; and it consists in the novel arrangement and combination of parts, as will be hereinafter more fully described, and designated in the claims.

In the drawings, Figure 1 is a top plan view of the trolley for conveying the current from the main conducting-wire to the motor of the vehicle. Fig. 2 is a side elevation of the same. Fig. 3 is a horizontal longitudinal section of one-half of said trolley, taken on the line $a\,a$ of Fig. 2. Fig. 4 is a similar section of the other half, taken immediately on the line $y\,y$ of Fig 2. Fig. 5 is a vertical cross semi-section of the trolley, taken on the line $x\,x$ of Fig. 2. Fig. 6 is a vertical longitudinal section of the subway, showing a bare conductor arranged in sections. Fig. 7 is a vertical cross-section of the said subway, trolley, and main conducting-wire. Fig. 8 is a sectional top plan view of the tracks for the trolley, the switch, and the supports for the sectional conductor. Fig. 9 is a side elevation of a switch used in carrying out the invention. Fig. 10 is a vertical section of the casing for said switch with the various parts contained therein. Fig. 11 is an inverted section of the same, taken on the line $b\,b$ in Fig. 10. Fig. 12 is a bottom plan view of the switch. Fig. 13 is a top plan view of the same. Fig. 14 is a top plan view of the subway, showing one plate in position and one removed. Fig. 15 is a diagram of the system, showing the trolleys in relative positions with the different sections of the sectional conductor and also the direction of the current. Fig. 16 is a diagram of the same, showing a different relative position of the trolleys and the sections of the sectional conductor and also the direction of the current. Fig. 17 is a vertical broken section of the switch.

Referring to the drawings, 1 represents the main insulated conducting-wire which leads from the stationary dynamo, or other source of electrical energy; and the opposite end thereof terminates in space.

2 represents a series of switches located in the conduit and electrically connected and secured to said main conducting-wire, and the number of said switches is equal to the number of sections of sectional bare conductor 3 employed. The switches are suspended and mechanically fastened by means of brackets 4 to a continuous line of rails 5, which rails form a track for trolleys 6. The switches are also suspended directly beneath the opening between the ends of the sectional bare conductor, and each switch is electrically connected to the same by an insulated support 7, which support leads from its section of said bare conductor to the inner mechanism of the switch. Said sectional conductor is also supported by means of insulated supports 7, as above described, which supports are mounted on a median supporting-plate 8, also in sections. Said plate is situated between the rails 5, and is mechanically secured at intervals of its length to cross-bars 9 of subway 10 by suitable devices, such as short rods, bolts, or brackets.

11 represents a cylindrical rotating case or covering for said switches. Said casing is constructed after the manner of what is commonly known as a "diving-bell," and is so devised that when the axis thereof is in a substantially vertical position it prevents the access of water or other fluids into its cavity by the elastic resistance or pressure of the air contained in said cavity.

A case or covering is set over each switch and its contained mechanism, and is secured to an insulating-cylinder 13 by means of screws 12, passing through the top of said case or covering and into cylinder 13 of the switch, thereby rigidly securing the parts together.

Having made a general statement in regard to the interposition of the switches in the circuit, I will now proceed to describe their essential mechanism in detail.

14 represents a metallic rod, soldered or otherwise tightly secured in an opening in the top of the case or covering, for holding the various parts of the switch in juxtaposition, the lower or terminal portion of which rod is headed and rests in a socket 40, suitably formed for its reception in a circular metallic base-plate 15. Said base-plate is provided with an annular rim or flange 16, upon which flange approximately rests the lower cylindrical edge of casing 11.

Directly above base 15 is a plate of insulating material 17, the bottom of which is formed with a shouldered and reduced portion to rest within a recess in the said base, as shown by dotted lines in Fig. 10, thereby insulating the base from the parts located above said insulating material.

Between the top of the casing and the insulating material is secured the before-mentioned cylinder 13, of any suitable non-conducting material, which is fastened to casing 11, and through the center of which the metallic rod 14 passes.

I will describe but a single switch, although the construction is the same for all of them. A lateral branch 18 of the main conducting-wire passes through the metallic base 15, being insulated therefrom, and leads upward and passes through the insulating material, and is then connected to a post 19, which is electrically connected to the uppermost spring 20 of the switch, the head 41 of which spring is normally in connection with a contact-plate 21, mounted on one side of cylinder 13. The lower spring 22 of said switch is also connected to an upright post 23, for supporting the same, and is also electrically connected therewith. Said spring is provided with two branches 64 and 65. To branch 65 wire 7, that leads from sectional conductor, is attached, and branch 64 simply acts as a conducting contact device electrically communicating with branch 65 and contact-plate 21. Thus it will be readily seen how the current passes from spring 20 to the sectional conductor. It may be pointed out, however, that the current does not pass out through the lower terminal of the shorter post 23, as this post has its lower end embedded in insulation. This is clearly shown in Figs. 7 and 10. The electric current passes into a lateral branch 18, leading from the main conducting-wire, and from said lateral branch ultimately passes into spring 20. From spring 20 it is transmitted to contact-plate 21, and from said contact-plate is conducted into branch 64 of spring 22, and from branch 64 it passes into branch 65, and from said branch the current is conducted by wire 7, electrically connected to said branch, to a section of the sectional conductor. (See Fig. 6.) From said section the current is collected and conducted by contact-springs 29 into wire 28, in electrical communication with said springs, to the motor of the vehicle. From the motor of the vehicle the current passes into rail 47, and by suitable electrical connections is reconducted to its appropriate pole of the dynamo at the power-house.

At each switch the main conducting-wire, as above stated, is provided with a lateral branch 18, which passes down through a metallic insulating-tube 24, which is in contiguity with said switch, and thence passes up to the uppermost spring 20 of said switch, lying normally in contact with a projecting contact-plate 21. (See Figs. 7, 10, and 11.) At a point near its rearward end each section of the bare conductor is supported, as usual; but said insulated support, instead of terminating in the median plate 8, passes through said plate into another tube 24 and downward below the bottom of the switch, and is then bent upward and passed through a perforation in the metallic base of said switch. The lower spring also has a contact-head 42 lying normally out of contact with the contact-plate 21. (See Figs. 6 and 10.)

The vehicle or car has a trolley 6, electrically and mechanically connected at its front end in any well-known manner, as well understood by electricians and mechanics, and a similar trolley mechanically connected at its rear end. The mechanical connection between said vehicle and trolley may be formed by means of a (see Fig. 2) metallic tube 25, flexibly secured to the upper part of the truck-frame of said trolley by a ball-joint of well-known construction, and thence passed upward through the slot 27, formed in the subway, then connected to the vehicle in a mechanical manner, and electrically connected to the motor or motors carried thereby in the well-known way.

The electrical connection is formed by means of a wire 28, passing through said metallic tube and connected to the motor of the vehicle, the opposite end of said wire being electrically connected to contact-springs 29 of the trolley. Four of these springs are used upon each trolley, one or more of them projecting at each end thereof, and they have their respective ends bent downward, so as to slide over obstructions when moved in either a forward or backward direction. They are mechanically connected to truck 26, but insulated therefrom by a plate of insulating material 30. Said springs are so arranged and secured to the trucks as to be continually in contact with the lower surface of the sections of the bare conductor 3, as shown in Figs. 15 and 16. Secured to the lower portion of said trucks are inclines, bolts, or springs 31, which project downward and below said trolleys and are adapted to come in contact with upwardly-projecting arm 32 of switches 2, whereby spring 20 is thrown in contact with plate 21, thereby completing circuit through the forward section of sectional conductor 3. As the trolleys 6 pass over the trolley-track, the contact-springs bearing against the under surface of sectional conductor 3, when the projecting wedges 31 strike arm 32, the current in the main conducting-wire is diverted and conveyed to and through this immediate section of the sectional conductor, is carried off by contact-springs 29 into wires 28, and thence to the motor of the vehicle. The trolleys should be so arranged and connected to the vehicle that the distance between the centers of the two trolleys is greater than the length of a section plus the length of one trolley. By so doing, when the foremost of said trolleys has passed over a section of the sectional conductor, the rear trolley will strike the arm of the switch connected to the section just passed over and throw it to its normal position, thereby cutting out said section and preventing possible loss of electrical energy thereafter through it.

The operation of opening and closing the switches is performed by the devices shown in Fig. 3, taken in connection with the diagrammatic Figs. 15 and 16. Thus the sections are singly and consecutively charged as electromotive force is needed in propelling the vehicle and as the vehicle advances.

In Fig. 1, 33 represents wheels or trolleys 6, which wheels are made after the usual construction of car-wheels, with their outer peripheries flanged to prevent them from running off the track, and also to provide sufficient room between the rails. The trucks have ∩-shaped yokes, so as to pass over sectional conductor 3, which is projected up between the rails for obvious purposes. The ends of said ∩-shaped yokes, forming the essential part of said trucks, are mechanically secured to horizontal side bars 34, which bars carry at their opposite ends rotating wheels 33. Secured to the upper sides of said bars 34 are plates of insulating material 30, to which plates the contact-springs and plates supporting them are mechanically secured, thereby insulating said springs from the various parts of the trolley. The springs are mechanically connected to inwardly-curved tubes 44, which contain and shield insulated wires 28, which wires lead through said upright pieces to the motor of the vehicle.

In Fig. 13, 43 represents a series of manhole plates, which are used to form a covering for the side of the conduit. Said subway is also provided with a cavity 45, in which the trolleys and mechanism connected therewith can freely move, and also a cavity 35, situated directly beneath said cavity 45, but separated therefrom at regular and suitable distances by a series of cross-bars 9, which form supports for the trolley-rails 5, and the median plate 8. Said cavity 35 is adapted for the interposition of the switches and also for the reception of dirt, &c., which may fall through the opening 27 made in the subway.

On one side of cavities 45 and 35 are similar ones 36, separated at suitable and regular distances by upright pieces 37; but communicating with each of said cavities at one side. These cavities are made to permit access to the underground mechanism whenever desired.

It will be observed that the sections of bare conductor which I employ are substantially inflexible, being rigidly supported at different intervals throughout their lengths, and therefore incapable of either vertical or transverse movement.

The operation: An electric-railway line constructed as above described will clearly prevent loss of current even if the sections of the bare conductor become entirely submerged in water or snow slush or exposed to heavy moisture. From the motor or motors on the car to the dynamo it is obvious that I may make use of any known arrangement of conductors to complete the circuit. For instance, as I here show, I put one of the surface rails 47 in circuit, making the usual connection therewith. (See Figs. 15 and 16 for diagrams of the circuit.) I prevent obstruction to the working of the operative mechanism placed in the conduit by providing means which will prevent contact of foreign substances which fall through the slot of the conduit with the sections of bare conductor. I afford due facilities for repairing of parts contained within the conduit and for cleaning out the same. My construction permits a vehicle to be easily switched upon a return-track without delay and without the necessity of being turned end for end at the terminals of the road. It is thought that the construction above set forth will render the workings of the underground conduit for this class of railways entirely practicable, notwithstanding the presence of water, cold, snow, dust, or the entrance of solid matter into the conduit. The factor of safety from electrical discharges to human beings and brutes passing along or over the road is very effective. It will be observed that I provide one main supply-conductor, which is completely inclosed and effectually protected from any and all exterior influences, electrically connected to the dynamo or other source of electrical energy, place it in the conduit and conveniently suspend it from cross-bars 9 of the subway-yokes, and which cross-bars also sustain two trolley-rails, a median plate for the sections of the bare conductor, the whole extending throughout the length of the road. Each section of the bare conductor is somewhat longer—say six or eight feet—than the length of the vehicle; but each of said sections is of one length and in cross-section is substantially T-shaped, covered with insulation upon its upper surfaces, but entirely bare upon its under surfaces. Although I here show a small trolley or car adapted to run on the above-mentioned tracks for performing the mechanical functions for throwing the different sections of the bare conductor into and out of circuit, as above stated, yet it should be evident that I may use any suitable device in customary use for the same purpose—such, for instance, as a trolley having either a single or double wheel or roller suspended from the vehicle and adapted for contact with said sections of the bare conductor and with the projecting arms of the switches arranged along the line. In the present case I use one trolley which is to be attached to the forward end of the vehicle and another trolley adapted to be attached to the rearward end of same. The distance between the two trolleys is greater than the length of a section of the bare conductor, the difference in distance being preferably that of the length of one trolley. Only the forward trolley conveys current by means of its brushes, the rear or following trolley fulfilling no electrical function whatsoever, serving merely as a mechanical device for throwing the switches back to their normal position. However, in running the vehicle in an opposite direction upon a double-track road the rear trolley takes the advance, and it being electrically fitted, similar to the forward trolley, may be used for the forward trolley in such cases by connection with the ordinary current-controlling devices at present in use upon motor-cars, as will be understood. Now to proceed with the operation of a single-track road the switches and each of them consecutively as the cars and trolleys advance together are thrown by contact therewith of the inclines of the forward trolley to the position indicated by the dotted lines in Fig. 8, which establishes electrical continuity between the main supply-conductor and the successive section of the bare conductor, and after the forward trolley has passed to the next successive section the section just passed over is thereby wholly thrown out of circuit, and the rear trolley advancing throws the switch thereof and cuts out the section and leaves it in condition to be similarly acted upon by the trolleys of the next following vehicle. The switches are, as will be observed, constructed to make and break a circuit by a rocking movement imparted to their contact-springs, (to and fro,) and are provided with a case or covering having a closed upper end mounted to rotate on a vertical axis, whereby access of water or other fluids to the cavity of the case or covering and to the contact devices located therein is prevented by the resistance or pressure of air contained in said cavity. The relative location of the switches and the sections of the bare conductor is such that each switch is acted upon by the rearward trolley in cutting out a section only after such section can no longer form a part of an electrical circuit, and it will therefore be readily seen that as no current is passing at the time of cutting out sparking consequent burning and injury of the switch is rendered wholly impossible. This result depends, essentially, upon the fact that the rearward or cutting-out trolley is maintained at a distance from the leading or circuit-making trolley greater than the length of a section of the bare conductor by at least the length of one trolley. When now, in operating a road as herein described, the motor of the vehicle being mounted thereon in the usual manner and current is applied to the main supply-conductor, the car moves forward toward the right hand in Figs. 15 and 16, the leading trolley within the conduit is caused to advance upon its rails until its incline comes in contact with the arm or projection of the first switch. This is thrown over in the direction just above stated, and by such movement throws the first section of bare conductor in circuit just in advance of said switch, the forward of the four brushes of the said trolley being already in contact with the said section, while the rearward of said brushes of the said leading trolley are still in contact with the section of the conductor just in the rear of the switch newly acted upon, so that at this moment the four brushes receive current from two sections of the conductor at the same time. An instant later, however, as the forward movement of the car continues, all four of the brushes of this trolley will have passed upon the same section and will receive current through their multiplied contacts through it alone, the section just left having been thrown out of circuit by the advance of the trolley. At this moment, or much later, if desirable, (but never earlier,) the rearward trolley returns the switch to normal position. Thus the vehicle may continue to advance by repeated action of the switches and sections of bare conductor without breaking the current at any point along the line, save a possibly slight sparking between the rear brushes of the leading trolley and the forward end of the sections passed over, which, however, will be very slight, most possibly altogether absent, inasmuch as a clean current is established by the advance brushes of the trolley before the rearward brushes leave the sections passed over, nor will there be any interference with the workings of the current-controlling devices usually fitted on the vehicle. When the end of the road is reached by the vehicle, said vehicle and its trolleys are switched onto a section of road provided with any usual switching appliances, and is then to be returned to about its previous starting-point upon another track. Any of the electrical connections now in use upon electrically-propelled vehicles may be employed in manipulating the motor or motors to accomplish the movement of the vehicle in either case; but the trolleys attached to the vehicle in my system are made to assume functions opposite to those fulfilled when the vehicle was moving in the direction first mentioned—viz., the one on the right hand in Fig. 15, that was then the leading trolley, is now the rearward trolley, and vice versa. As the switches and their projecting arms are placed on both lines of the double-track road (as regards the under side of the car) in the same relative position, the progress of the car is effected by the same mechanical and electrical connections that have just been described, the inclines on the trolleys being what I may term "double-ended," the inclination on one end serving for the outgoing track and those on the other end for the incoming or return track. In Fig 16, 60 represents the electrical connections which I establish upon the car between the trolley at the forward end of the car and motor thereof upon the return trip, 61 indicating the suitable switch by means of which the now forward trolley is electrically connected to the motor. Of course in single-track lines this connection 60 will not be used. The bare conductor and switches may be omitted from any reasonable length of roadway—say, for example, any distance over which a railway-car may be carried by its own momentum—and consequently there will be experienced no embarrassments in providing for branch roads or crossings or other lines of the same or usual construction, or even of cable lines if the cable thereof is made to pass under the conduit. The subway-plates being removable, access may be had at any time to the mechanism of the line, not only from the top, as is usual, but particularly from one side and below.

A road constructed as herein described will be proof against dampness, wet, snow, and ice, as all parts transmitting a current or capable of doing so are securely insulated and incased in proper protective material, except the sections of the bare conductor, and these only on their under surfaces, the road thereby being operative in all weathers and all conditions of humidity, and indeed under water during floods and heavy rains. The distance between the forward and rear brushes of any one trolley being comparatively slight—say seven inches—and the length of the trolley being but about one foot, no difficulty will be experienced in passing over sharp curves of twenty-five to thirty feet radius.

It will be seen that although both the leading and rear trolleys of the vehicle are provided with brushes, yet only the brushes of the leading trolley are in use during the advance of the vehicle, the brushes of the rear trolley being cut out of circuit during such advance, although moving in contact with the bare conductor. If desirable, however, the brushes of the rearward trolley may be removed until they are again called into use, as before stated.

Having fully described my invention, what I claim is—

1. In a conduit electric railway having a bare conductor made up of sections of a predeterminate length, two mechanical contact devices, such as trolley-arms, fixed upon a vehicle at a greater distance apart than the length of a single section of said bare conductor, and one of said mechanical contact devices having electrical wires mounted thereon and carrying connections for taking current from the sections of said bare conductor, substantially as specified.

2. A conduit system of current distribution for electric railways, comprising a rigidly-mounted conductor made up of sections, a main supply-conductor, a vehicle, a mechanical device electrically and mechanically connected to the forward end of the vehicle, and a similar device connected to the rearward end of same and performing only mechanical functions, the distance apart at which the two mechanical devices are fixed being greater than the length of a single section of said sectional conductor, substantially as herein specified.

3. In a conduit system of current distribution for electric railways, a switch case or covering having an imperforate upper end and adapted to rock or rotate on a vertical axis, in combination with movable contacts and other portions of an electrical switch inclosed within the same, and whereby access of water or other fluids to the cavity of said case or covering will be prevented by the elastic resistance of air contained in said cavity, substantially as herein specified.

4. In an electric railway, a switch constructed with an outer case or covering having an imperforate upper end and a projecting arm and adapted to be rocked or rotated, a contact adapted to rock or rotate with said case or covering, and a second contact fixed against rotation, substantially as specified.

5. In an electric railway, a switch comprising an outer covering having a projecting arm adapted to be rocked or rotated, an insulated cylinder provided with a contact-plate and rigidly secured to said case or covering, a metallic base or support for said covering, a plate of insulating material mounted on said metallic base, posts suitably mounted upon the base, and contact-springs carried by said posts and adapted for contact with said contact-plate upon the rocking or vibrating of said outer covering, substantially as and for the purposes specified.

6. In an electric railway, a trolley comprising opposite longitudinal side bars carrying rotating wheels, contact devices secured to said side bars, but insulated therefrom, ∩-shaped yokes connecting the side bars, shielding-tubes having wires located therein and secured to said ∩-shaped yokes, and inclined surfaces adapted for contact with a fixed arm of a switch or switches, substantially as herein specified.

7. A sectional bare conductor, in combination with a sectional supporting-plate 8 and a series of short supports 7, forming rigid mechanical connections between opposite parallel sections of the bare conductor and supporting-plate, substantially as specified.

8. A conduit for electrical railways, having a central slotted cavity 45, provided with cross-bars 9, adapted to support a trolley-track and the conductor or conductors, a lower cavity 35, located directly beneath and communicating with the first-mentioned cavity, side cavities 36, communicating at one side with both cavities 45 and 35, and covers for said side cavities capable of removal without disturbing the condition of the other cavities, substantially as specified.

9. In a conduit electric railway having a sectional conductor located in the conduit thereof, a vehicle carrying a motor and a wheeled trolley located in said conduit and carrying contact devices, such as springs 29, adapted to move in contact with said sectional conductor, one or more of said springs projecting at the forward end of said wheeled trolley and one or more projecting in an opposite direction at the rear end of said trolley and separated from the one or more springs at the forward end of the trolley, that the springs at both ends thereof may simultaneously contact with the contiguous ends of two sections of said sectional conductor, substantially as specified.

10. In a conduit electric railway having a sectional bare conductor, a main supply-conductor, a series of switches adapted to electrically connect the sections of said sectional conductor with said main supply-conductor, a vehicle carrying a motor, and a current-collecting device adapted to move in contact with said bare conductor, the hereinbefore-described method of preventing sparking in the switches and consequent injury thereto, which consists in first throwing an initial section of said bare conductor in main circuit with said main supply-conductor and said motor, then advancing said collector upon and along said section of the bare conductor while said section is in said circuit, then before cutting out this said section and by reason of the advance of the vehicle throwing a switch and thereby placing the next consecutive section in electrical continuity with said main supply-conductor, then advancing said collector to the section thus thrown into electrical continuity, as aforesaid, and by such advance establishing a new and distinct main circuit between said main supply-conductor and said motor, and thereby wholly interrupting the first-named circuit, and then by the further advance of the vehicle throwing back to normal position the switch which previously placed said initial section in electrical continuity with said main supply-conductor, whereby sparking is prevented in the switches and all leakage through the sections of said sectional bare conductor is obviated, substantially as specified.

11. In a conduit electric railway, a trolley comprising opposite longitudinal side bars carrying wheels which support the trolley, contact devices carried by said trolley, but insulated therefrom, a trolley-arm adapted to connect the trolley to a car *via* the slot in the conduit, a ball or similar universal joint flexibly connecting the trolley-arm to the trolley, and proper electrical wiring between said contact devices and said trolley-arm, substantially as specified.

In testimony whereof I affix my signature in presence of two witnesses.

WILLIAM H. FORD.

Witnesses:
E. E. LONGAN,
C. K. JONES.